(12) United States Patent
Hudek et al.

(10) Patent No.: US 12,387,122 B2
(45) Date of Patent: Aug. 12, 2025

(54) DEFLECTORS FOR INDIVIDUALLY ADDRESSING LONG ION CHAINS

(71) Applicant: IonQ, Inc., College Park, MD (US)

(72) Inventors: Kai Makoto Hudek, Hyattsville, MD (US); Jeremy Matthew Sage, Acton, MA (US); Neal Pisenti, Laurel, MD (US)

(73) Assignee: IonQ, Inc., College Park, MD (US)

( * ) Notice: Subject to any disclaimer, the term of this patent is extended or adjusted under 35 U.S.C. 154(b) by 433 days.

(21) Appl. No.: 18/062,338

(22) Filed: Dec. 6, 2022

(65) Prior Publication Data
US 2024/0054376 A1     Feb. 15, 2024

Related U.S. Application Data

(60) Provisional application No. 63/286,900, filed on Dec. 7, 2021.

(51) Int. Cl.
| | |
|---|---|
| *G06N 10/20* | (2022.01) |
| *G02F 1/33* | (2006.01) |
| *G06N 10/40* | (2022.01) |
| *G21K 1/00* | (2006.01) |

(52) U.S. Cl.
CPC ............... *G06N 10/20* (2022.01); *G02F 1/33* (2013.01); *G06N 10/40* (2022.01); *G21K 1/003* (2013.01)

(58) Field of Classification Search
CPC .......... G06N 10/20; G06N 10/40; G02F 1/33; G21K 1/003
See application file for complete search history.

(56) References Cited

U.S. PATENT DOCUMENTS

| | | | |
|---|---|---|---|
| 2020/0082291 A1 | 3/2020 | Debnath et al. | |
| 2021/0057872 A1 | 2/2021 | Mizrahi et al. | |
| 2021/0272006 A1 | 9/2021 | King et al. | |
| 2023/0162074 A1* | 5/2023 | Debnath | G06N 10/40 706/62 |
| 2024/0054380 A1* | 2/2024 | Sage | G02F 1/11 |
| 2025/0037896 A1* | 1/2025 | Welte | G21K 1/003 |

OTHER PUBLICATIONS

Debnath et al., "Demonstration of a small programmable quantum computer with atomic qubits", Nature Journal, vol. 536, Aug. 2016, 10 pages.
International Search Report and Written Opinion issued for Int'l Appl. No. PCT/US22/81063, Int'l Filing Date Dec. 7, 2022, mailed Mar. 16, 2023.

* cited by examiner

*Primary Examiner* — Nicole M Ippolito
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to the use of deflectors in trapped ion QIP systems for individually addressing long ion chains. Methods are described for using acousto-optic deflectors (AODs) in optical Raman transitions to implement single-qubit gates and two-qubit gates. A QIP system is also described that is configured to use AODs in optical Raman transitions to implement single-qubit gates and two-qubit gates.

20 Claims, 8 Drawing Sheets

DEFLECTORS FOR INDIVIDUALLY ADDRESSING LONG ION CHAINS

PRIORITY

This application claims priority to and the benefit from U.S. Patent Provisional Application No. 63/286,900, filed on Dec. 7, 2021, and titled "Acousto-Optic Deflectors for Individually Addressing Long Ion Chains," the contents of which are incorporated herein by reference in their entirety.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of the use of deflectors in trapped ion QIP systems for individually addressing long ion chains. For example, a method for implementing quantum gates is described that includes steering, by a first optical deflector, a first optical beam at a first angle towards a first set of optical components, and imaging, by the first set of optical components, the first optical beam onto a first ion in an ion chain along a first direction. The method further includes steering, by a second optical deflector, a second optical beam at the first angle towards a second set of optical components, and imaging, by the second set of optical components, the second optical beam onto the first ion along a second direction different from the first direction. The method further includes implementing a quantum gate using the first ion and based on the first optical beam and the second optical beam being imaged onto the first ion.

In connection with the method described above, a quantum computer is also described that includes a first set of optical components and a second set of optical components, an ion trap configured to trap an ion chain, a first optical deflector configured to steer a first optical beam at a first angle towards the first set of optical components, and a second optical deflector configured to steer a second optical beam at the first angle towards the second set of optical components. The first set of optical components is configured to image the first optical beam onto a first ion in the ion chain along a first direction. The second set of optical components is configured to image the second optical beam onto the first ion along a second direction different from the first direction. Moreover, a single-qubit quantum gate is implemented using the first ion and based on the first optical beam and the second optical beam being imaged onto the first ion.

Another method for implementing quantum gates is described that includes steering, by a first optical deflector, a first optical beam towards a first set of optical components and imaging, by the first set of optical components, the first optical beam onto a first ion in an ion chain along a first direction. The method further includes steering, by a second optical deflector, a second optical beam towards a second set of optical components, and imaging, by the second set of optical components, the second optical beam onto a second ion in the ion chain along a second direction different from the first direction. The method further includes steering, by a third optical deflector, a third optical beam towards a third set of optical components, and imaging, by the third set of optical components, the third optical beam onto the second ion along the first direction. The method further includes steering, by a fourth optical deflector, a fourth optical beam towards a fourth set of optical components, and imaging, by the fourth set of optical components, the fourth optical beam onto the first ion along the second direction. The method further includes implementing a quantum gate using the first ion and the second ion and based on the first optical beam and the fourth optical beam being imaged onto the first ion and the second optical beam and the third optical beam being imaged onto the second ion.

In connection with the method described above, a quantum computer is also described that includes a first set of optical components, a second set of optical components, a third set of optical components, and a fourth set of optical components, an ion trap configured to trap an ion chain, a first optical deflector configured to steer a first optical beam towards the first set of optical components, a second optical deflector configured to steer a second optical beam towards the second set of optical components, a third optical deflector configured to steer a third optical beam towards the third set of optical components, and a fourth optical deflector configured to steer a fourth optical beam towards the fourth set of optical components. The first set of optical components is configured to image the first optical beam onto a first ion in an ion chain along a first direction. The second set of optical components is configured to image the second optical beam onto a second ion in the ion chain along a second direction different from the first direction. The third set of optical components is configured to image the third optical beam onto the second ion along the first direction. The fourth set of optical components is configured to image the fourth optical beam onto the first ion along the second direction. Moreover, a two-qubit gate is implemented using the first ion and the second ion and based on the first optical beam and the fourth optical beam being imaged onto the first ion and the second optical beam and the third optical beam being imaged onto the second ion.

In this disclosure, the term quantum computer may be used interchangeably with the term QIP system to mean a system or device capable of performing quantum operations and algorithms.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
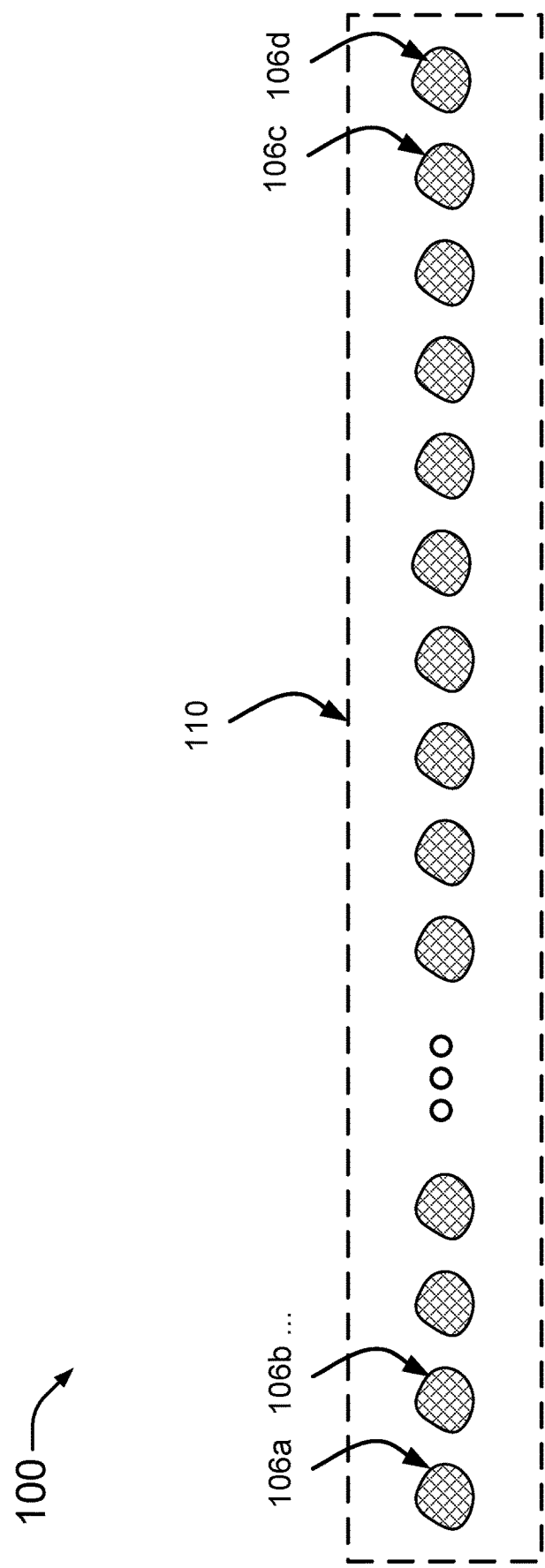
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

Optical Raman operations are typical means by which single-qubit gates and two-qubit gates are performed or implemented on trapped ions in a quantum computer. Optical Raman operations are further employed for laser cooling, as well as system characterization and calibration. The speed at which operations, and thus algorithms, can be performed is, in many architectures, limited by the optical intensity that can be delivered to ions in a linear chain (see e.g., FIG. 1). For example, in a trapped ion quantum computer that uses an N-channel acousto-optic modulator (AOM) hardware approach for addressing the ions in a chain, the power output from the laser is typically split N ways before the AOM, meaning: a) the power delivered to each ion is 1/N of the total power; and b) when performing gates on a small subset of ions, n, at a time within the chain, most of the power is wasted because the set of N-n beams not addressing the ions is idle power.

An approach with which this problem could be circumvented is to use steering technology to direct the laser intensity. One technology could be the use of an M×M-element micro-electromechanical system (MEMS) based steering of Raman optical beams that is capable of delivering M pairs of Raman optical beams to M arbitrary pairs of ions at a time, where M is a number between 2 and N. For M=2, this allows the laser power to be used most efficiently, at the expense of having the ability to address multiple pairs of ions simultaneously. However, the power handling of MEMS mirrors for relevant wavelengths in trapped ion quantum computers, such as 532 nanometer (nm) light, is currently believed to be only ~100 milliwatts (mW) per optical beam (and is even less for UV light, such as the typical 355 nm), and is therefore relatively low, and can still limit the speed at which operations, and thus algorithms, can be performed.

Electro-optic deflectors (EGDs) are another steering technology that allows for directed laser intensity. For certain applications, these are desirable, as they can have less noise and greater linearity. However, there are three main limitations that make this technology more challenging for trapped ion quantum computing. The first, and most critical, is the deflection range. A typical chain of ions holds many ions. In an example, the chain can hold 32 ions to implement 32 qubits. State-of-the-art (SoA) EODs can only address a small subset of that number, around 2-3, using typical beam parameters at the ion chain. The second limitation is polarization purity and stability. EOD crystals are typically sensitive to the environment and voltage applied, and trapped ions require very precise polarization control. The third limitation is speed, which is limited by the ability to drive high voltage (HV) into a capacitive load and is on the order of milliseconds (ms) or faster.

In this disclosure, a different approach is proposed that utilizes acousto-optic deflectors (AODs) to steer pairs of Raman optical beams in a manner that has comparable functionality to the MEMs approach, but which will allow for the delivery of substantially higher laser intensity than both the MEMS and the AOM (e.g., N-channel AOM) approaches. Additionally, the use of AODs takes advantage of the fast (~1-5 ms) optical switching times of acousto-optic devices and does not rely on mechanical movement like MEMS, which is potentially prone to wear.

Solutions to the issues described above are explained in more detail in connection with FIGS. 1-7, with FIGS. 1-3 providing a background of QIP systems or quantum computers, and more specifically, of atomic-based QIP systems or quantum computers.

Figure 2:
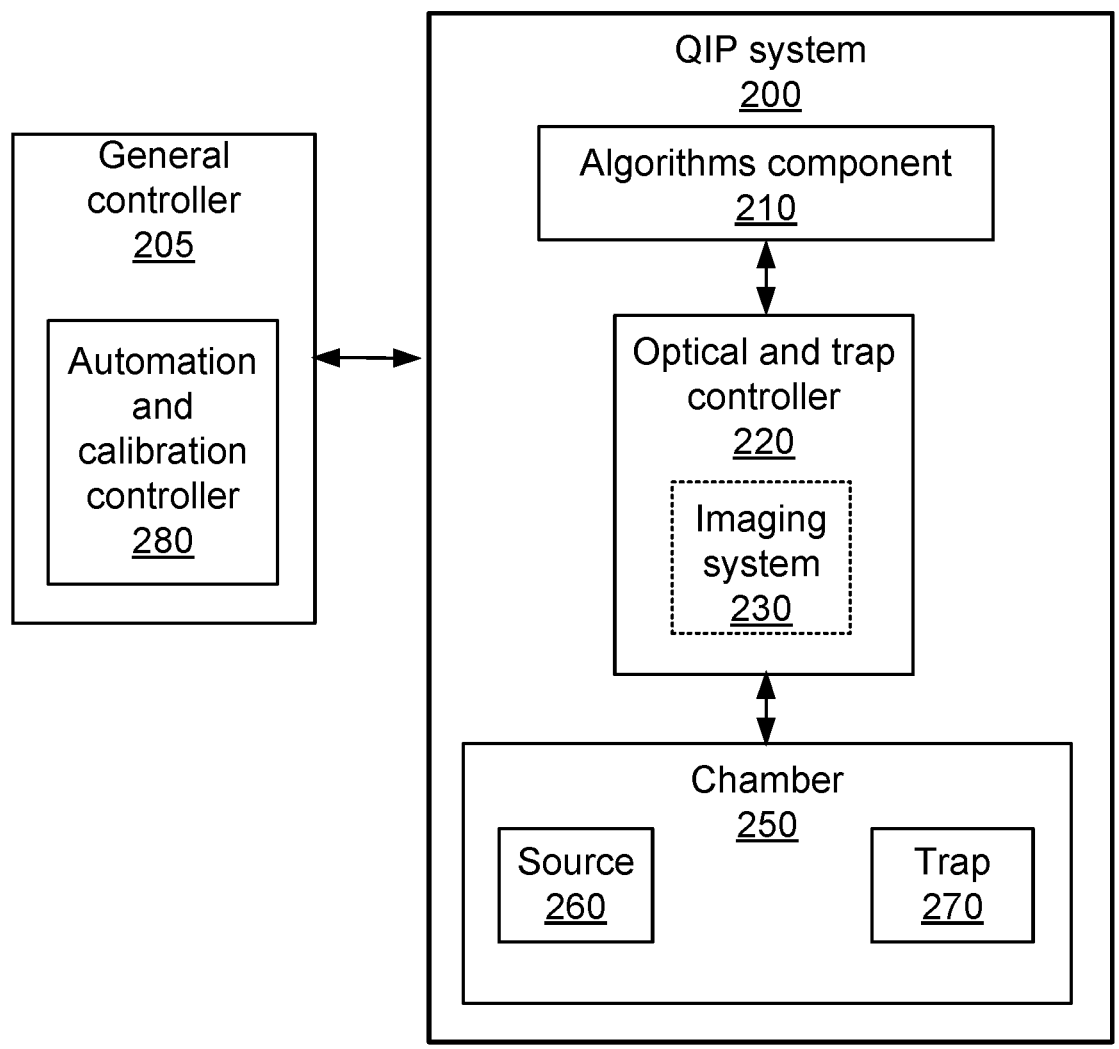
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap may be referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system. Moreover, a quantum processor, sometimes referred simply as a processor, may indicate a portion of the quantum computer or QIP system that includes the chain 110 and uses the ions 106 in the chain 110 to perform quantum operations.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using optical components in the QIP system 200, including those that are part of and controlled by the optical and trap controller 220, the imaging system 230 and/or the chamber 250.

Figure 3:
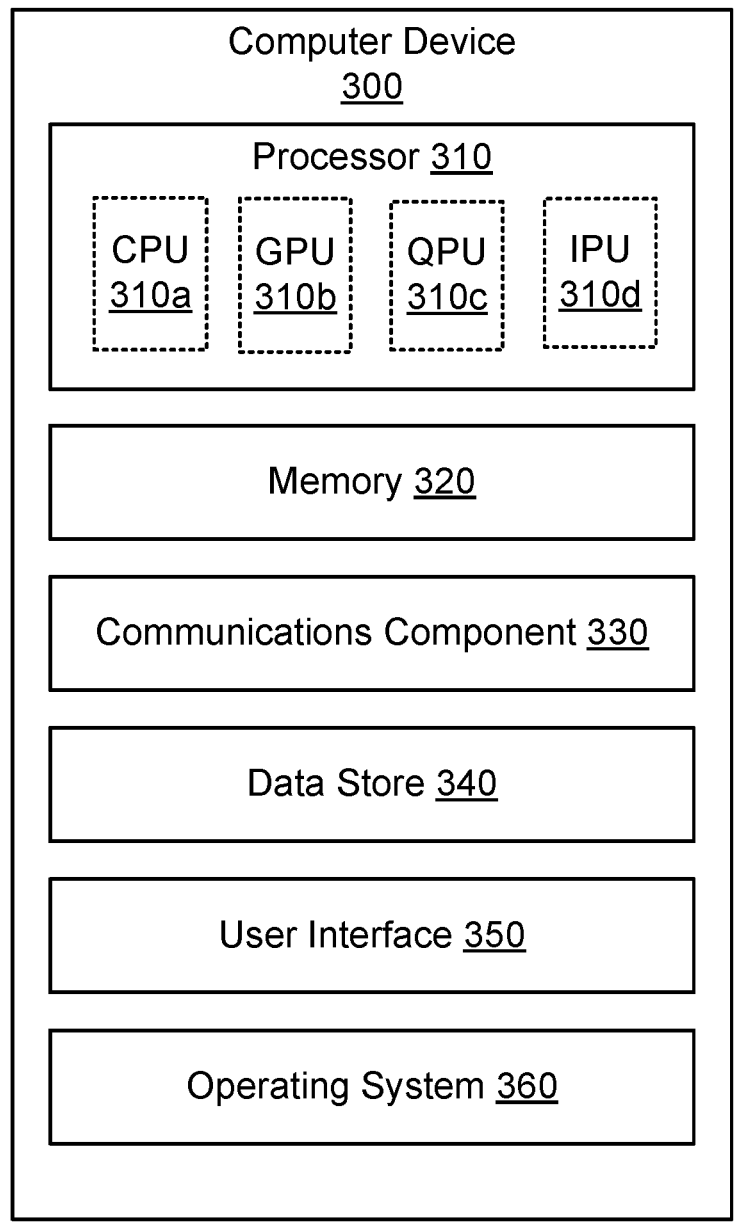
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, methods and systems for using AODs to steer pairs of Raman optical beams are described in more detail below.

Figure 4A:
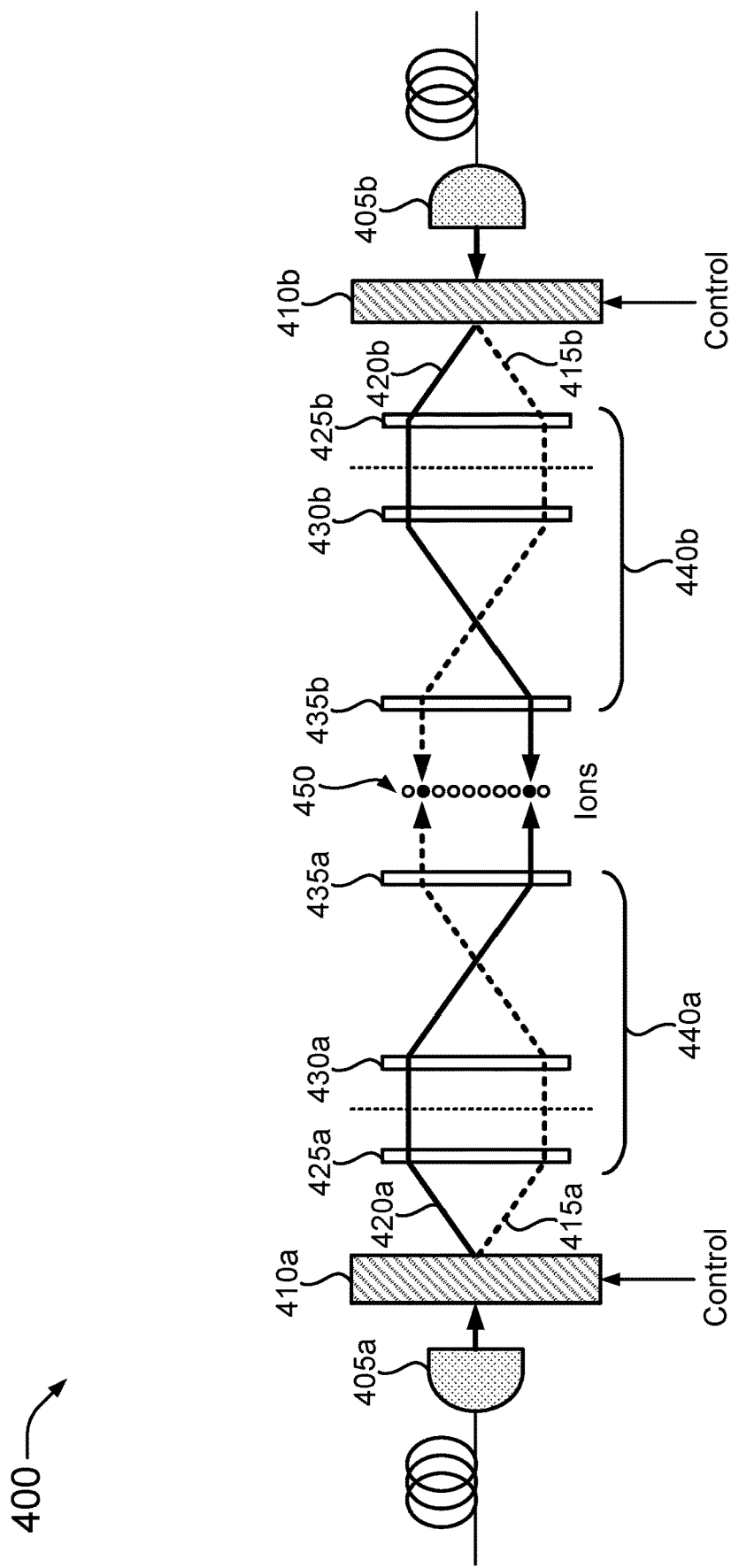
FIGS. 4A and 4B illustrate an example of a counter-propagating optical beam scanning system in accordance with aspects of this disclosure.
Figure 4B:
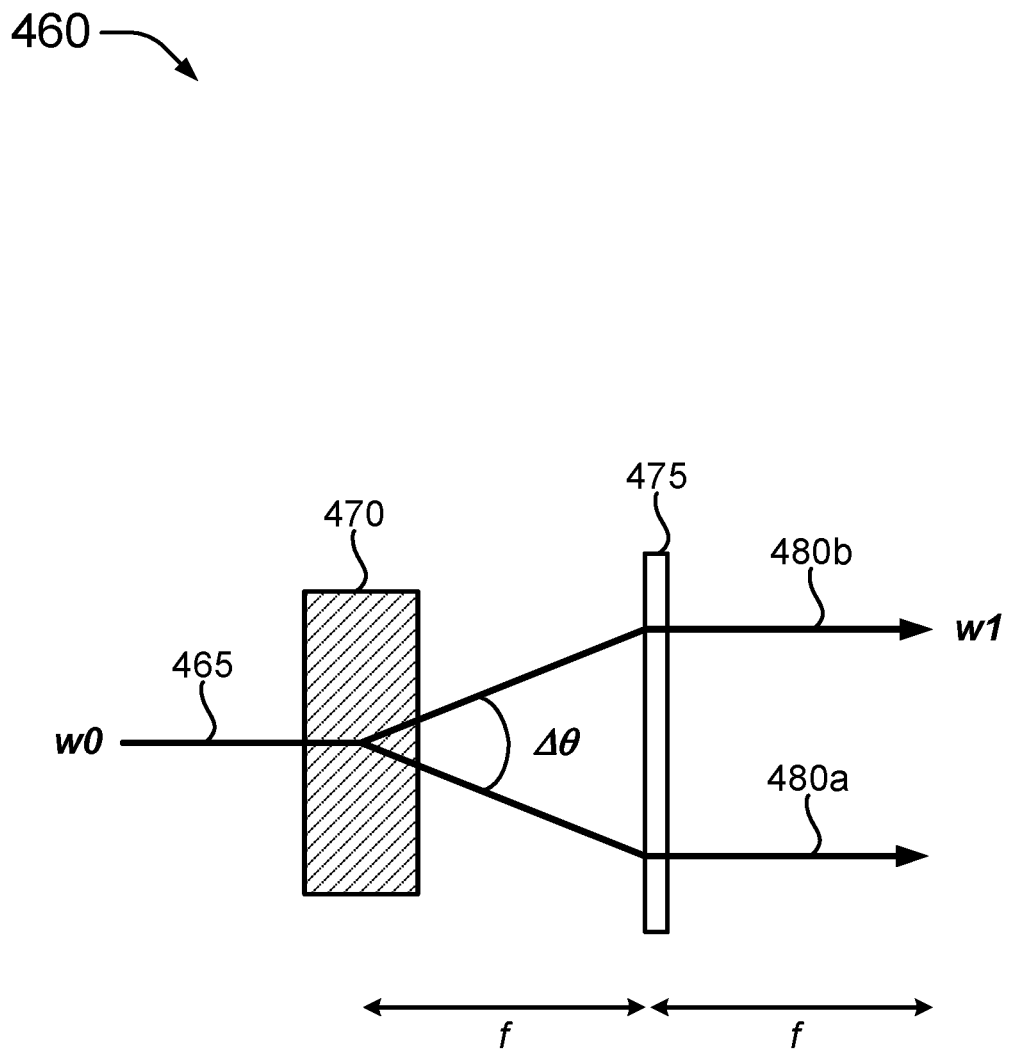

FIGS. 4A and 4B show diagrams 400 and 460, respectively, that illustrate an example of a counter-propagating optical beam scanning system that uses deflectors (e.g., AODs) for optical beam steering. The general concept utilizes symmetrical optical systems in each propagation direction (a double individual addressing configuration), the positional-dependent frequency of the AOD is canceled out, maintaining a constant difference frequency, Df, between the beams from difference propagation directions. In this example, a pair of optical beams can be applied to different ions in an ion chain to implement single-qubit or two-qubit gates using the respective ions.

The diagram 400 shows a left system that includes an optical beam source 405a, a deflector 410a, and a set of optical components 440a having imaging optical components 425a, 430a, and 435a. The diagram 400 also shows a right system that includes an optical beam source 405b, a deflector 410b, and a set of optical components 440b having imaging optical components 425b, 430b, and 435b. The deflectors 410a and 410b may be implemented with AODs to steer optical beams (based on control signals) from the left system and from the right system onto an ion plane 450 having multiple ions (e.g., ions 106 in the chain 110). Therefore, the left system and the right system and their AODs may be used as a counter-propagating beam scanning or beam steering system, where the optical projection operation converts the frequency input into each AOD to a particular position (i.e., a particular ion position) at the ion plane 450. However, the left and right systems may have any angle between them that is not zero.

In the diagram 400, the different optical beams from an AOD represent different frequencies out of the AOD (e.g., dashed line could be a lower frequency and the solid line could be a higher frequency). As shown, the AODs 410a and 410b are producing an identical high-frequency tone (solid line) that is projected or imaged onto the same ion at the bottom of the chain at the ion plane 450. For example, an optical beam 420a and an optical beam 420b are imaged onto the same, lower ion in the chain from opposite directions. To address a different ion at the top of the chain at the ion plane 450, the lower frequency tone (dashed line) could alternately be turned on. For example, an optical beam 415a and an optical beam 415b are both imaged onto the same, upper ion in the chain from opposite directions.

For ion manipulation, only the frequency difference (DO is important. Thus, if the applied frequency of the higher frequency (or lower frequency) tone from the left system matches that from the right system the frequency difference will be zero, effectively removing the frequency dependence of the AOD with respect to beam position.

In an example, a chain of ions (see e.g., FIG. 1) having 32 ions with a spacing of 3 mm between ions may typically use an individual addressing laser waist (i.e., optical beam waist) of 1 micron (mm). To address each of the ions in the entire chain, the AOD optical beam scanning system needs at a minimum N=32 resolvable spots (one for each ion in the example) and a 93 mm field of view (FOV). The number of resolvable spots is given by the formula:

$$N = \Delta\theta/\Delta\Theta,$$

where $\Delta\theta$ is angular range of the AOD (in radians), and $\Delta\Theta$ is the Gaussian divergence of the input beam (or 1/D).

Commercially available AODs generally have an angular range of 3 degrees and an aperture exceeding 1 mm. This allows, for example, about 100 resolvable spots for a 1 mm diameter input optical beam with +/−1.5 degrees at 532 nm laser wavelength. Each resolvable spot corresponds to one of the multiple supported angles at which an AOD can steer or deflect an input optical beam. For comparison, MEMS with a 250 mm diameter beam and +/−6 degrees at 532 nm wavelength allows for about 100 resolvable spots. The FOV can be evaluated by calculating the effective focal length (EFL) of the optical projection system, which transforms the Gaussian waist at the AOD, here 0.5 mm, to another Gaussian waist at the ion, here 1 mm. The formula for the EFL is:

$$EFL = \pi \times w_{AOD} \times w_{ion}/\lambda,$$

which for 532 nm light results in an EFL=2.95 mm. The FOV is then:

$$FOV = EFL \times \Delta\theta,$$

which gives an FOV=2.95 mm×3 degrees=155 mm. For comparison, in the case of a MEMS system, EFL=1.48 mm and FOV=1.48 mm×12 degrees=310 mm.

The diagram 460 in FIG. 4B illustrates an example of the EFL and FOV calculations. In this example, $w_{AOD} = w_0$ and $w_{ion} = w_1$, with the input optical beam 465 to the AOD 470 having a Gaussian waist $w_0$ and optical beams 480a and 480b imaged onto ions by optical component 475 having Gaussian waists $w_1$. In this example, f is a focal length between the AOD 470 and the optical component 475, and also between the optical component 475 and the plane of ions.

AODs may also be used to overcome the power limitations of MEMS devices. An SoA AOD, as used in the example provided above, can handle an estimated 10 W or greater of optical power, whereas the equivalent MEMS mirror can handle an estimated 100 mW of optical power. This 100× increase in power handling capability has great implications for gate speed and thus fidelity and error, with the ability to handle higher power being preferred.

Figure 5:
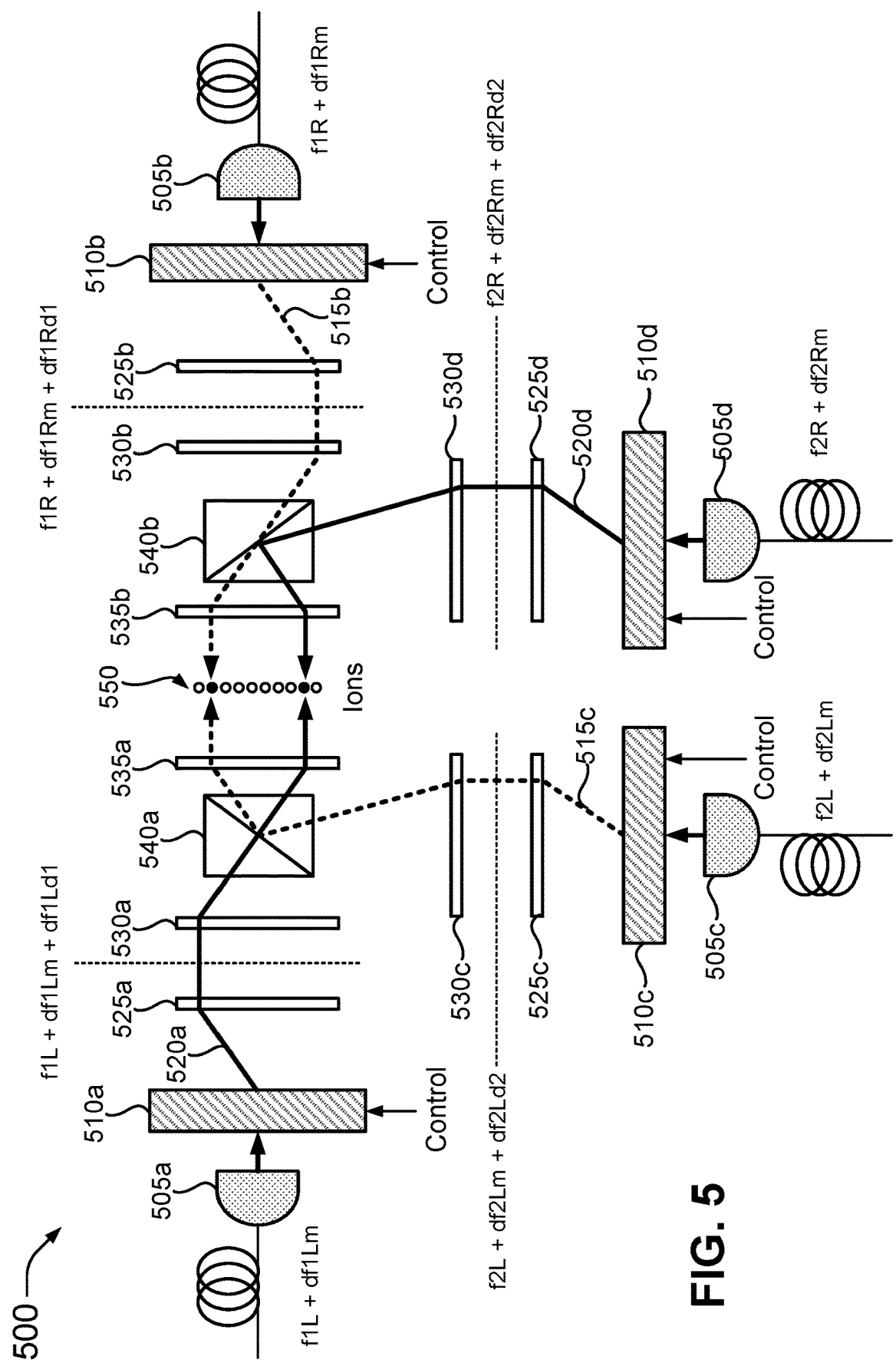
FIG. 5 illustrates an example of a deflector-based Raman optical system in accordance with aspects of this disclosure.

FIG. 5 shows a diagram 500 that illustrates an example of a schematic of a deflector-based Raman optical system in accordance with aspects of this disclosure. In this example, four (4) deflectors (e.g., AODs) are used to generate two pairs of Raman optical beams. By having two pairs of optical beams, it is possible to implement two-qubit gates with this system.

The diagram 500 shows a first combination of AODs comprising AOD 510a and AOD 510b, and a second combination of AODs comprising AOD 510c and AOD 510d. For AOD devices, the frequency of the steered optical beam (e.g., by Bragg diffraction) is Doppler-shifted based on the frequency of the sound wave used for the deflector. The frequency into AOD 510a can be represented as f1L+df1Lm and the output frequency can be represented as f1L+df1Lm+df1Ld1. The frequency into AOD 510b can be represented as f1R+df1Rm and the output frequency can be presented as f1R+df1Rm+df1Rd1. The frequency into AOD 510c can be represented as f2L+df2Lm and the output frequency can be represented as f2L+df2Lm+df2Ld2. The frequency into AOD 510d can be represented as f2R+df2Rm and the output frequency can be represented as f2R+df2Rm+df2Rd2.

Changing the frequency sent to the AOD (e.g., dflLd1 to AOD 510a), in the form of a control signal, results in a change in beam deflection angle, and subsequent imaging optics convert angular deflection into a beam translation along the ion chain axis. Due to the ideal symmetry of the optical configuration, and because Raman transitions depend only on the frequency difference between the two beams in a pair (e.g., between dashed lines or between solid lines), the system can take advantage of "double-individual" addressability (and its concomitant low-crosstalk) with low complexity in frequency shifting: e.g., df1Ld1=df1Rd1; df2Ld2=df1Rd2. Small left/right asymmetries in the optical system will require small deviations from these equalities; to make up the frequency offsets seen by the qubits; small corrections can be made via upstream modulation AOMs (not shown) which shift the frequencies df1Lm, df1Rm, df2Lm, and df2Rm, recovering and modifying the above equalities to e.g., df1Ld1+df1Lm=df1Rd1+df1Rm; df2Ld2+df2Lm=df1Rd2+df2Rm.

To drive multiple two-qubit gates simultaneously, multiple pairs of AODs can be combined in order to increase the number of individual manipulations of optical beams, with the unit cell of AODs in the diagram 500 being replicated. To address multiple chains, the upstream combination optics and the final projection optics can be accommodated, and the two-AODs described in connection with the diagram 500 can be replicated to provide scalability.

In the example described in the diagram 500, there is shown a left system that includes an optical beam source 505a, the deflector or AOD 510a, a set of optical components having imaging optical components 525a, 530a, 535a. and a beam splitter 540a. The diagram 500 also shows a right system that includes an optical beam source 505b, the deflector of AOD 510b, a set of optical components having imaging optical components 525b, 530b, 535b, and a beam splitter 540b. Also shown in a bottom system that includes an optical beam source 505c, the deflector or AOD 510c, a set of optical components having imaging optical components 525c and 530c and the beam splitter 540a and optical component 535a that are shared with the left system. Moreover, another bottom system that includes an optical beam source 505d, the deflector or AOD 510d, a set of optical components having imaging optical components 525d and 530d and the beam splitter 540b and optical component 535b that are shared with the right system. The AODs are configured to steer optical beams (based on control signals) from the left system, the right system, and the bottom systems onto an ion plane 550 having multiple ions (e.g., ions 106 in the chain 110). Therefore, the left system, the right system, and the bottom systems and their AODs may be used to provide counter-propagating beam scanning or beam steering system, where the optical projection operation converts the frequency input into each AOD to a particular position (i.e., a particular ion position) at the ion plane 550.

The AOD also has a unique advantage over other beam scanning systems, e.g., MEMS or EODs, in that it can drive multiple tones, and thus multiple beams at the same time, thus being able to realize parallel, or even global operations in a software defined manner. For example, such an approach can be used to generate multiple beams by sending in multiple RF tones. Any nonlinearity will create tone mixing that can generate extra beams. It is possible to get around this by operating deep within the linear regime of the AOD device, or with active phase control over the tones or using, for example, splines or arbitrary waveform generators (AWGs). This type of phase control could be used to implement gates and could be used for sideband cooling.

There may be other general advantages to a scanning system, which is a different modality than the fixed, imaged system that is typically used in most trapped ion quantum computers. For example, scanning systems like AOD and MEMS can address non-uniform or arbitrarily spaced ions. When a multi-channel AOM is using only 2 channels, the other channels are off (wasted power). An AOD system that has 2 channels uses 100% of the power. Moreover, the multi-channel AOM system is discrete, and aberrations could lead to ion-beam overlap error and could be a source of infidelity. An AOD system can be calibrated to remove this error.

It is to be understood that aspects of the systems described above in connection with FIGS. 4A, 4B, and 5 may be implemented at least partially using the optical and trap controller 220, the imaging system 230, and/or the chamber 250 of the QIP system 200 described above in connection FIG. 2.

Figure 6:
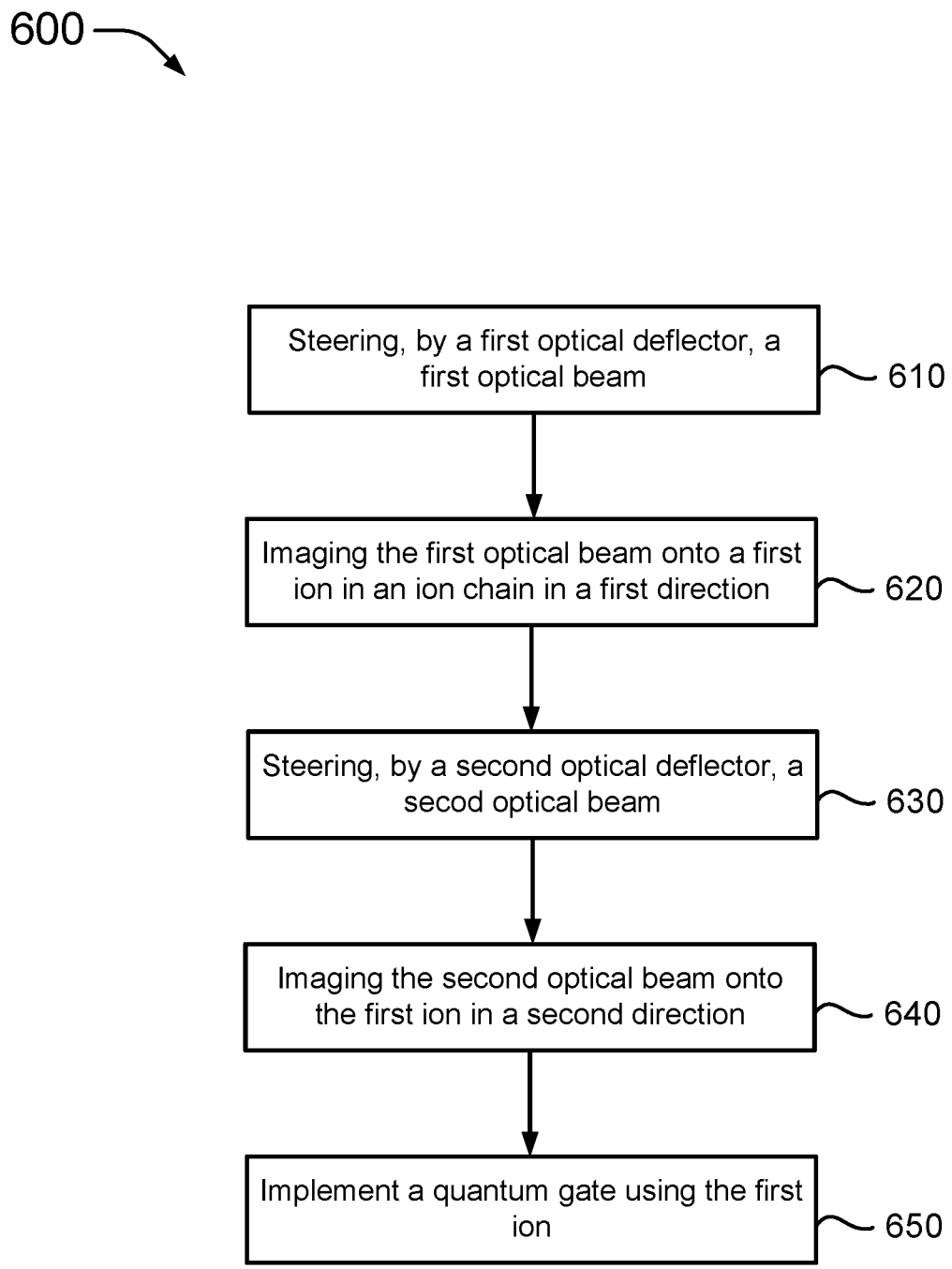
FIG. 6 illustrates an example of a method for implementing and operating a single-qubit gate using a deflector-based Raman optical system in accordance with aspects of this disclosure.

FIG. 6 illustrates an example of a method 600 for implementing and operating a single-qubit gate using a deflector-based (e.g., AOD-based) Raman optical system.

At 610, a first optical deflector (e.g., AOD 410a in FIG. 4A) steers a first optical beam (e.g., optical beam 420a) at a first angle towards a first set of optical components (e.g., optical components 525a, 430a, and 435a).

At 620, the first set of optical components images or projects the first optical beam onto a first ion in an ion chain (e.g., ions in an ion chain on the ion plane 450) along a first direction (e.g., from the left).

At 630, a second optical deflector (e.g., AOD 410b) steers a second optical beam (e.g., optical beam 420b) at the first angle towards a second set of optical components (e.g., optical components 425, 430b, and 435b).

At 640, the second set of optical components images or projects the second optical beam onto the first ion along a second direction (e.g., from the right) different from the first direction.

At 650, a quantum gate is implemented using the first ion and based on the first optical beam (e.g., the optical beam 420a) and the second optical beam (e.g., the optical beam 420b) being imaged onto the first ion.

In an aspect of the method 600, the first optical deflector is an AOD for steering the first optical beam in any one of multiple angles (e.g., resolvable spots) supported by the first optical deflector that include the first angle. Moreover, the second optical deflector is an AOD for steering the second optical beam in any one of multiple angles supported by the second optical deflector that include the first angle. The method 600 further includes selecting the first angle from the multiple angles supported by the first optical deflector (e.g., by applying an input control signal to the first deflector with a particular frequency) and selecting the first angle from the multiple angles supported by the second optical deflector (e.g., by applying an input control signal to the second deflector with a particular frequency). AODs may support a continuous range of angles at which they can steer or direct optical beams, thus, a particular angle from that range may be used to achieve a certain resolvable spot that coincides with the position or location of a particular ion in a chain.

In an aspect of the method 600, the first direction and the second direction are opposite directions (e.g., counter-propagating directions). In other scenarios, the directions need not be opposite but may be at 90 degrees, for example.

In another aspect of the method 600, the quantum gate implemented using the first ion is a single-qubit quantum gate.

In anther aspect of the method 600, the method 600 includes generating a first control signal that is provided to the first optical deflector for changing the steering of the first optical beam towards the first set of optical components from the first angle to a second angle different from the first angle (e.g., as shown by the different steering direction of optical beam 415a compared to optical beam 420a). The method 600 also includes generating a second control signal that is provided to the second optical deflector for changing the steering of the second optical beam from the first angle to the second angle (e.g., as shown by the different steering direction of optical beam 415b compared to optical beam 420b). The method 600 further includes imaging, by the first set of optical components, the first optical beam onto a second ion in the ion chain along the first direction, imaging, by the second set of optical components, the second optical beam onto the second ion along the second direction, and implementing the quantum gate using the second ion and based on the first optical beam and the second optical beam being imaged onto the second ion. The quantum gate implemented using the second ion is a single-qubit quantum gate.

A QIP system for implementing the method 600 may be based on the Raman configuration described in FIG. 4A and the QIP system 200 described in connection with FIG. 2.

Figure 7:
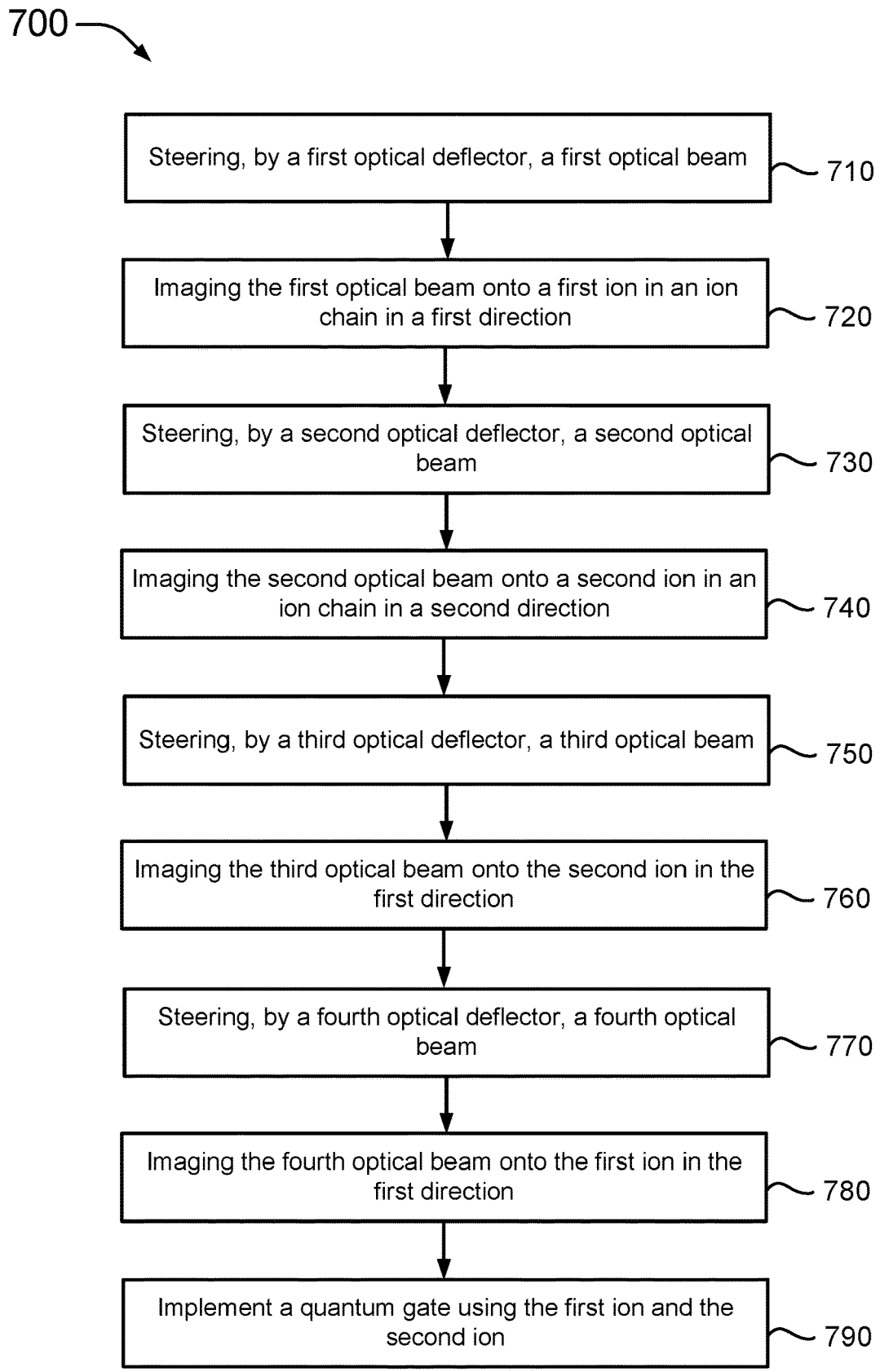
FIG. 7 illustrates an example of a method for implementing and operating a two-qubit gate using a deflector-based Raman optical system in accordance with aspects of this disclosure.

FIG. 7 illustrates an example of a method 700 for implementing and operating a two-qubit gate using a deflector-based (e.g., AOD-based) Raman optical system.

At 710, a first optical deflector (e.g., AOD 510a in FIG. 5) steers a first optical beam (e.g., optical beam 520a) towards a first set of optical components (e.g., optical components 525a, 530a, 540a, and/or 535a).

At 720, the first set of optical components images, projects, or transforms the first optical beam onto a first ion in an ion chain (e.g., ions in an ion chain on the ion plane 550) along a first direction (e.g., from the left);

At 730, a second optical deflector (e.g., AOD 510b) steers a second optical beam (e.g., optical beam 515b) towards a second set of optical components (e.g., optical components 525b, 530bm 540b, and/or 535b).

At 740, the second set of optical components images, projects, or transforms the second optical beam onto a second ion in the ion chain along a second direction (e.g., from the right) different from the first direction.

At 750, a third optical deflector (e.g., AOD 510c) steers a third optical beam (e.g., optical beam 515c) towards a third set of optical components (e.g., optical components 525c, 530c, 540a, and/or 535a).

At 760, the third set of optical components images, projects, or transforms the third optical beam onto the second ion along the first direction (e.g., from the left).

At 770, a fourth optical deflector (e.g., AOD 510d) steers a fourth optical beam (e.g., optical beam 520d) towards a fourth set of optical components (e.g., optical components 525d, 530d, 540b, and/or 535b).

At 780, the fourth set of optical components images, projects, or transforms the fourth optical beam onto the first ion along the second direction (e.g., from the right).

At 790, a quantum gate is implemented using the first ion and the second ion and based on the first optical beam and the fourth optical beam being imaged onto the first ion and the second optical beam and the third optical beam being imaged onto the second ion.

In an aspect of the method 700, each of the first optical deflector, the second optical deflector, the third optical deflector, and the fourth optical deflector is an AOD for steering a respective optical beam in any one of multiple angles (e.g., resolvable spots of the AODs).

In another aspect of the method 700, the method 700 includes selecting, for each of the first optical deflector, the second optical deflector, the third optical deflector, and the fourth optical deflector, a respective steering angle from multiple pre-set steering angles supported (e.g., by applying an input control signal to a respective deflector with a particular frequency).

In another aspect of the method 700, the first direction and the second direction are opposite directions (e.g., counter-propagating directions).

In another aspect of the method 700, the steering of the first optical beam and the fourth optical beam is performed at steering angles configured to enable the imaging or projecting, by the first set of optical components and the fourth set of optical components, respectively, of the first optical beam and the fourth optical beam onto the first ion. Moreover, the steering of the second optical beam and the third optical beam is performed at steering angles configured to enable the imaging or projecting, by the second set of optical components and the third set of optical components, respectively, of the second optical beam and the third optical beam onto the second ion.

In another aspect of the method 700, the quantum gate implemented using the first ion and the second ion is a two-qubit quantum gate.

A QIP system for implementing the method 700 may be based on the Raman configuration described in FIG. 5 and the QIP system 200 described in connection with FIG. 2.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for implementing quantum gates, comprising:
    steering, by a first optical deflector, a first optical beam at a first angle towards a first set of optical components;
    imaging, by the first set of optical components, the first optical beam onto a first ion in an ion chain along a first direction;
    steering, by a second optical deflector, a second optical beam at the first angle towards a second set of optical components;
    imaging, by the second set of optical components, the second optical beam onto the first ion along a second direction different from the first direction; and
    implementing a quantum gate using the first ion and based on the first optical beam and the second optical beam being imaged onto the first ion.

2. The method of claim 1, wherein:
    the first optical deflector is an acousto-optic deflector (AOD) for steering the first optical beam in any one of multiple angles supported by the first optical deflector that include the first angle, and
    the second optical deflector is an AOD for steering the second optical beam in any one of multiple angles supported by the second optical deflector that include the first angle.

3. The method of claim 2, further comprising:
    selecting the first angle from the multiple angles supported by the first optical deflector; and
    selecting the first angle from the multiple angles supported by the second optical deflector.

4. The method of claim 1, wherein the first direction and the second direction are opposite directions.

5. The method of claim 1, wherein the quantum gate implemented using the first ion is a single-qubit quantum gate.

6. The method of claim 1, further comprising:
    generating a first control signal that is provided to the first optical deflector for changing the steering of the first optical beam towards the first set of optical components from the first angle to a second angle different from the first angle;
    generating a second control signal that is provided to the second optical deflector for changing the steering of the second optical beam from the first angle to the second angle;

imaging, by the first set of optical components, the first optical beam onto a second ion in the ion chain along the first direction;

imaging, by the second set of optical components, the second optical beam onto the second ion along the second direction; and implementing the quantum gate using the second ion and based on the first optical beam and the second optical beam being imaged or transformed onto the second ion.

7. The method of claim 6, wherein the quantum gate implemented using the second ion is a single-qubit quantum gate.

8. A method for implementing quantum gates, comprising:

steering, by a first optical deflector, a first optical beam towards a first set of optical components;

imaging, by the first set of optical components, the first optical beam onto a first ion in an ion chain along a first direction;

steering, by a second optical deflector, a second optical beam towards a second set of optical components;

imaging, by the second set of optical components, the second optical beam onto a second ion in the ion chain along a second direction different from the first direction;

steering, by a third optical deflector, a third optical beam towards a third set of optical components;

imaging, by the third set of optical components, the third optical beam onto the second ion along the first direction;

steering, by a fourth optical deflector, a fourth optical beam towards a fourth set of optical components;

imaging, by the fourth set of optical components, the fourth optical beam onto the first ion along the second direction; and implementing a quantum gate using the first ion and the second ion and based on the first optical beam and the fourth optical beam being imaged onto the first ion and the second optical beam and the third optical beam being imaged onto the second ion.

9. The method of claim 8, wherein each of the first optical deflector, the second optical deflector, the third optical deflector, and the fourth optical deflector is an acousto-optic deflector (AOD) for steering a respective optical beam in any one of multiple angles.

10. The method of claim 8, further comprising selecting, for each of the first optical deflector, the second optical deflector, the third optical deflector, and the fourth optical deflector, a respective steering angle from multiple pre-set steering angles supported.

11. The method of claim 8, wherein the first direction and the second direction are opposite directions.

12. The method of claim 8, wherein:

the steering of the first optical beam and the fourth optical beam is performed at steering angles configured to enable the imaging or transforming, by the first set of optical components and fourth set of optical components, respectively, of the first optical beam and the fourth optical beam onto the first ion, and the steering of the second optical beam and the third optical beam is performed at steering angles configured to enable the imaging or transforming, by the second set of optical components and the third set of optical components, respectively, of the second optical beam and the third optical beam onto the second ion.

13. The method of claim 8, wherein the quantum gate implemented using the first ion and the second ion is a two-qubit quantum gate.

14. A quantum computer, comprising:

a first set of optical components and a second set of optical components;

an ion trap configured to trap an ion chain;

a first optical deflector configured to steer a first optical beam at a first angle towards the first set of optical components; and a second optical deflector configured to steer a second optical beam at the first angle towards the second set of optical components, wherein the first set of optical components is configured to image the first optical beam onto a first ion in the ion chain along a first direction, wherein the second set of optical components is configured to image the second optical beam onto the first ion along a second direction different from the first direction, and wherein a single-qubit quantum gate is implemented using the first ion and based on the first optical beam and the second optical beam being imaged onto the first ion.

15. The quantum computer of claim 14, wherein:

the first optical deflector is an acousto-optic deflector (AOD) and is configured to steer the first optical beam in any one of multiple angles supported by the first optical deflector that include the first angle, and the second optical deflector is an AOD and is configured to steer the second optical beam in any one of multiple angles supported by the second optical deflector that include the first angle.

16. The quantum computer of claim 15, further comprising:

a controller configured to:
select the first angle from the multiple angles supported by the first optical deflector, and
select the first angle from the multiple angles supported by the second optical deflector.

17. The quantum computer of claim 14, further comprising:

a controller configured to:
change the steering of the first optical beam towards the first set of optical components from the first angle to a second angle different from the first angle, and
change the steering of the second optical beam from the first angle to the second angle;

wherein the first set of optical components is configured to image the first optical beam onto a second ion in the ion chain along the first direction, wherein the second set of optical components is configured to image the second optical beam onto the second ion along the second direction, and wherein a single-qubit quantum gate is implemented and operated using the second ion and based on the first optical beam and the second optical beam being imaged onto the second ion.

18. A quantum computer, comprising:

a first set of optical components, a second set of optical components, a third set of optical components, and a fourth set of optical components;

an ion trap configured to trap an ion chain;

a first optical deflector configured to steer a first optical beam towards the first set of optical components;

a second optical deflector configured to steer a second optical beam towards the second set of optical components;

a third optical deflector configured to steer a third optical beam towards the third set of optical components; and a fourth optical deflector configured to steer a fourth optical beam towards the fourth set of optical components, wherein the first set of optical components is configured to image the first optical beam onto a first ion in an ion chain along a first direction, wherein the second set of optical components is configured to image the second optical beam onto a second ion in the ion chain along a second direction different from the first direction, wherein the third set of optical components is configured to image the third optical beam onto the second ion along the first direction, wherein the fourth set of optical components is configured to image the fourth optical beam onto the first ion along the second direction, and wherein a two-qubit gate is implemented using the first ion and the second ion and based on the first optical beam and the fourth optical beam being imaged onto the first ion and the second optical beam and the third optical beam being imaged onto the second ion.

19. The quantum computer of claim 18, wherein each of the first optical deflector, the second optical deflector, the third optical deflector, and the fourth optical deflector is an acousto-optic deflector (AOD) configured to steer a respective optical beam in any one of multiple angles.

20. The quantum computer of claim 18, further comprising:

a controller configured to select, for each of the first optical deflector, the second optical deflector, the third optical deflector, and the fourth optical deflector, a respective steering angle from multiple pre-set steering angles supported.

* * * * *